(12) United States Patent  (10) Patent No.: US 12,367,762 B2
Aminaka et al.  (45) Date of Patent: Jul. 22, 2025

(54) INFORMATION PROVISION APPARATUS, SYSTEM, METHOD AND COMPUTER READABLE MEDIUM

(71) Applicant: NEC Corporation, Tokyo (JP)

(72) Inventors: Hiroaki Aminaka, Tokyo (JP); Kosei Kobayashi, Tokyo (JP); Tetsuro Hasegawa, Tokyo (JP); Kazuki Ogata, Tokyo (JP); Kei Yanagisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/278,747

(22) PCT Filed: Mar. 31, 2021

(86) PCT No.: PCT/JP2021/013946
§ 371 (c)(1),
(2) Date: Aug. 24, 2023

(87) PCT Pub. No.: WO2022/208775
PCT Pub. Date: Oct. 6, 2022

(65) Prior Publication Data
US 2024/0346924 A1   Oct. 17, 2024

(51) Int. Cl.
*G08G 1/065*   (2006.01)
*G06V 20/54*   (2022.01)
*G08G 1/04*   (2006.01)

(52) U.S. Cl.
CPC ............ *G08G 1/065* (2013.01); *G06V 20/54* (2022.01); *G08G 1/04* (2013.01)

(58) Field of Classification Search
CPC ............ G08G 1/065; G08G 1/04; G06V 20/54
See application file for complete search history.

(56) References Cited

U.S. PATENT DOCUMENTS

| 11,543,824 B2 * | 1/2023 | Dyer ....................... G08G 1/202 |
| 2008/0033640 A1 * | 2/2008 | Amano ............... G01C 21/3476 701/414 |

(Continued)

FOREIGN PATENT DOCUMENTS

| JP | 2000-132783 A | 5/2000 |
| JP | 2003-242599 A | 8/2003 |

(Continued)

OTHER PUBLICATIONS

International Search Report for PCT Application No. PCT/JP2021/013946, mailed on Jun. 22, 2021.

*Primary Examiner* — Mohamed Barakat

(57) ABSTRACT

Signal information acquisition means acquires signal information about a traffic light installed on a road. Video acquisition means acquires a video photographed near a first parking lot entrance facing the road. Prediction means predicts whether or not a queue of waiting vehicles will be formed near the first parking lot entrance based on the video near the first parking lot entrance and the signal information. Selection means selects, from among a plurality of parking lot entrances including the first parking lot entrance, a parking lot entrance to which a vehicle is to be guided based on a result of the prediction performed by the prediction means. Notification means notifies the vehicle of the parking lot entrance selected by the selection means.

18 Claims, 6 Drawing Sheets

(56) References Cited

U.S. PATENT DOCUMENTS

| | | | |
|---|---|---|---|
| 2009/0148259 A1* | 6/2009 | Shani | E04H 6/183 |
| | | | 414/757 |
| 2016/0110997 A1* | 4/2016 | Ur | G08G 1/00 |
| | | | 701/23 |
| 2017/0148324 A1* | 5/2017 | High | G08G 1/144 |
| 2020/0242924 A1* | 7/2020 | Publicover | G08G 1/087 |
| 2020/0278677 A1* | 9/2020 | Handelman | G06N 5/04 |
| 2021/0300340 A1* | 9/2021 | Noguchi | G08G 1/017 |

FOREIGN PATENT DOCUMENTS

| | | | | | |
|---|---|---|---|---|---|
| JP | 2004-252816 A | | 9/2004 | | |
| JP | 2009-211253 A | | 9/2009 | | |
| JP | 2015064719 A | * | 4/2015 | ......... | G01C 21/3407 |
| JP | 2021-026681 A | | 2/2021 | | |

\* cited by examiner

INFORMATION PROVISION APPARATUS, SYSTEM, METHOD AND COMPUTER READABLE MEDIUM

This application is a National Stage Entry of PCT/JP2021/013946 filed on Mar. 31, 2021, the contents of all of which are incorporated herein by reference, in their entirety.

TECHNICAL FIELD

The present disclosure relates to an information provision apparatus, system, method, and a computer readable medium.

BACKGROUND ART

As a related technique, Patent Literature 1 discloses a parking lot guidance apparatus for guiding vehicles to a parking lot with the plurality of entrance gates. The parking lot guidance apparatus described in Patent Literature 1 predicts a scheduled arrival time when a vehicle on which a user terminal is mounted arrives at a predetermined position using road information within a predetermined range of the parking lot. The parking lot guidance apparatus determines a time group to which the user terminal belongs based on the scheduled arrival time. The parking lot guidance apparatus manages vacancy information that shows vacant parking spaces at each entrance gate. Using the vacancy information, the parking lot guidance apparatus decides the entrance gate for the vehicle on which the user terminal is mounted belonging to each time group to enter.

For each time group, the parking lot guidance apparatus allocates user terminals to the entrance gate with many vacant parking spaces within a processing capacity of the entrance gate. Alternatively, for each time group, the parking lot guidance apparatus decides the entrance gate so that the ratio of the number of incoming vehicles to the processing capacity of each entrance gate is averaged within the range of vacant parking spaces. The parking lot guidance apparatus transmits information about the entrance gates and congestion prediction information to the user terminals as guidance information. Patent Literature 2 describes another related technique.

CITATION LIST

Patent Literature

Patent Literature 1: Japanese Unexamined Patent Application Publication No. 2015-64719
Patent Literature 2: Japanese Unexamined Patent Application Publication No. 2004-252816

SUMMARY OF INVENTION

Technical Problem

In Patent Literature 1, a parking lot guidance apparatus decides the entrance gate from which vehicles enter a parking lot for each time group. The user can enter the parking lot from the entrance gate decided using the vacancy information. However, the traffic status around the parking lot can change from time to time. In Patent Literature 1, the traffic status that changes from time to time is not taken into account, and users are not always able to reach the entrance gate smoothly.

In view of the above circumstances, an object of the present disclosure is to provide an information provision apparatus, system, method, and a computer readable media that can provide a user with information that can lead him/her smoothly to a parking lot.

Solution to Problem

In order to achieve the above object, the present disclosure provides an information provision apparatus as a first example aspect. The information provision apparatus includes signal information acquisition means for acquiring signal information about a traffic light installed on a road; video acquisition means for acquiring a video photographed near a first parking lot entrance facing the road; prediction means for predicting whether or not a queue of waiting vehicles will be formed near the first parking lot entrance based on the video and the signal information; selection means for selecting, from among a plurality of the parking lot entrances including the first parking lot entrance, a parking lot entrance to which a vehicle is to be guided based on a result of the prediction performed by the prediction means; and notification means for notifying the vehicle of the selected parking lot entrance.

The present disclosure provides an information provision system as a second example aspect. The information provision system includes: an imaging apparatus configured to photograph near a first parking lot entrance facing a road; and an information provision apparatus. The information provision apparatus includes: signal information acquisition means for acquiring signal information about a traffic light installed on the road; video acquisition means for acquiring a video photographed using the imaging apparatus; prediction means for predicting whether or not a queue of waiting vehicles will be formed near the first parking lot entrance based on the video and the signal information; selection means for selecting, from among a plurality of the parking lot entrances including the first parking lot entrance, a parking lot entrance to which a vehicle is to be guided based on a result of the prediction performed by the prediction means; and notification means for notifying the vehicle of the selected parking lot entrance.

The present disclosure provides an information provision method as a third example aspect. The information provision method includes: acquiring signal information about a traffic light installed on a road; acquiring a video photographed near a first parking lot entrance facing the road; predicting whether or not a queue of waiting vehicles will be formed near the first parking lot entrance based on the video and the signal information; selecting, from among a plurality of the parking lot entrances including the first parking lot entrance, a parking lot entrance to which a vehicle is to be guided based on a result of the prediction about whether or not the queue of waiting vehicles will be formed; and notifying the vehicle of the selected parking lot entrance.

The present disclosure provides a computer readable medium as a fourth example aspect. The computer readable medium stores a program for causing a computer to execute processing of: acquiring signal information about a traffic light installed on a road; acquiring a video photographed near a first parking lot entrance facing the road; predicting whether or not a queue of waiting vehicles will be formed near the first parking lot entrance based on the video and the signal information; selecting, from among a plurality of the parking lot entrances including the first parking lot entrance, a parking lot entrance to which a vehicle is to be guided based on a result of the prediction about whether or not the queue of waiting vehicles will be formed; and notifying the vehicle of the selected parking lot entrance.

Advantageous Effects of Invention

An information provision apparatus, system, method, and a computer readable media according to the present disclosure can provide a user with information that can lead him/her smoothly to a parking lot.

EXAMPLE EMBODIMENT

Figure 1:
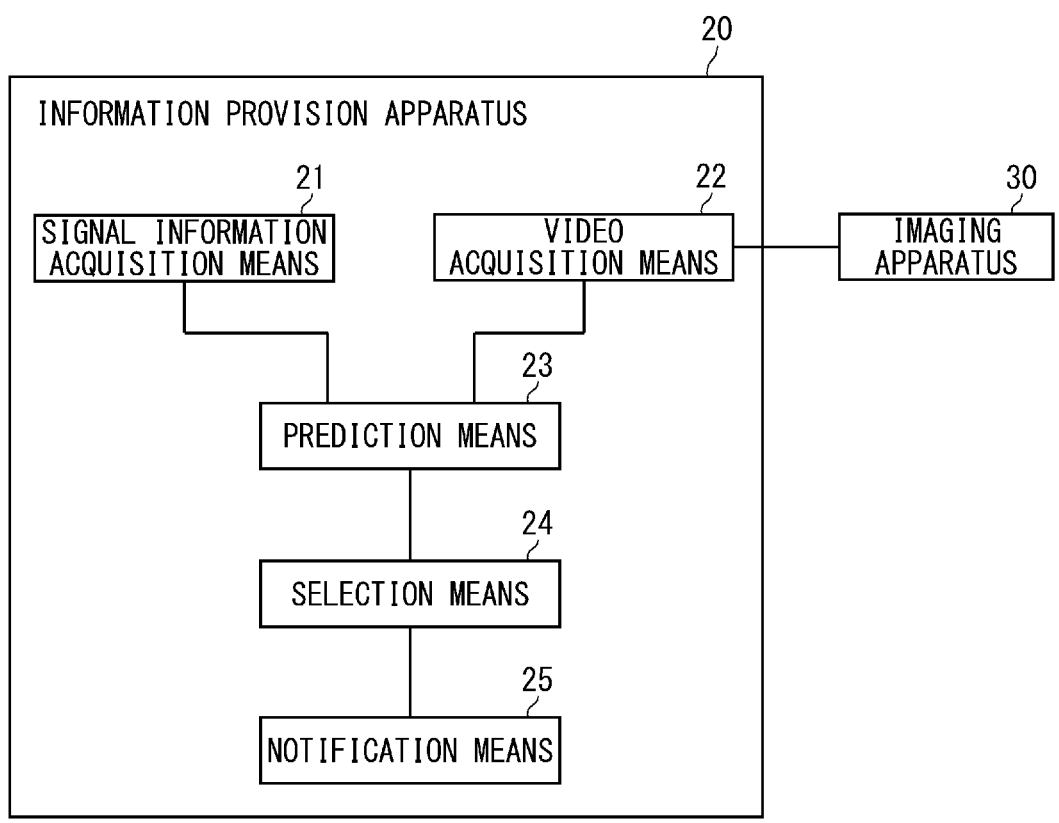
FIG. 1 is a block diagram schematically showing an information provision system according to the present disclosure.

An overview of the present disclosure is provided prior to the description of an example embodiment of the disclosure. FIG. 1 schematically shows an information provision system according to the present disclosure. An information provision system 10 has an information provision apparatus 20 and an imaging apparatus 30. The information provision apparatus 20 includes signal information acquisition means 21, video acquisition means 22, prediction means 23, selection means 24, and notification means 25.

The signal information acquisition means 21 acquires signal information, which is information about traffic lights installed on the road. The imaging apparatus 30 photographs videos near a first parking lot entrance facing the road. The image acquisition means 22 acquires a video photographed by the imaging apparatus 30. The prediction means 23 predicts whether or not a queue of waiting vehicles is formed near the first parking lot entrance based on the video near the first parking lot entrance and the signal information.

Based on a prediction result of the prediction means 23, the selection means 24 selects, from among a plurality of parking lot entrances including the first parking lot entrance, a parking lot entrance to which a vehicle is to be guided. The notification means 25 notifies the vehicle of the parking lot entrance selected by the selection means 24.

Traffic signals control traffic flow, so even if no vehicles are currently parked near the first parking lot entrance, a queue of vehicles extending from a traffic light may block the first parking lot entrance if light status of the traffic light changes from "can proceed" to "cannot proceed". In the present disclosure, the prediction means 23 predicts whether or not a queue of waiting vehicles will be formed near the first parking lot entrance based on a video of the vicinity of the first parking lot entrance and the signal information. The selection means 24 selects, from among the plurality of parking lot entrances, the first parking lot entrance or another parking lot entrance depending on whether a queue of waiting vehicles will be formed. By doing so, the present disclosure can smoothly guide a user to the parking lot entrance.

Figure 2:
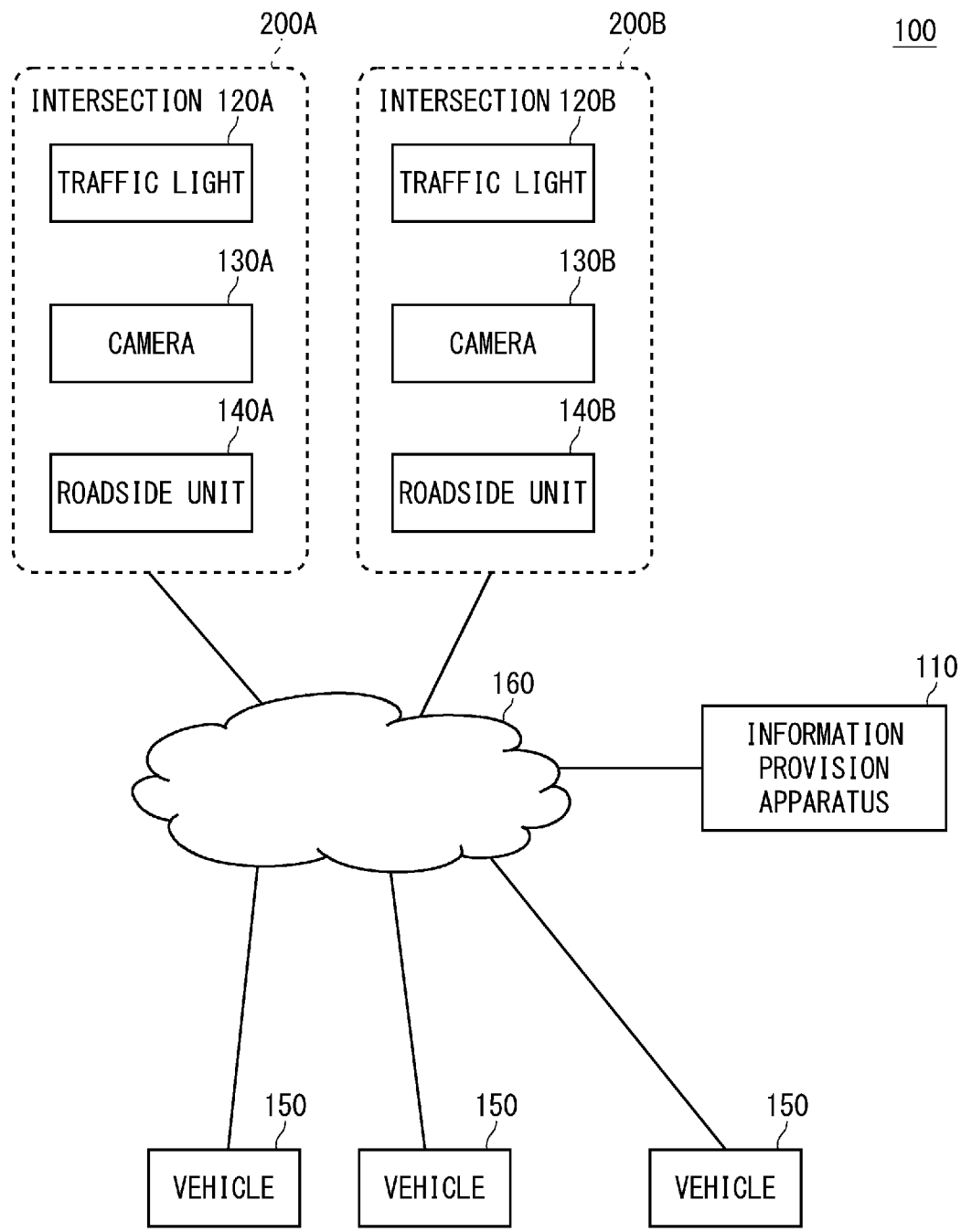
FIG. 2 is a block diagram showing an information provision system according to an example embodiment of the present disclosure.

An example embodiment of the present disclosure is described in detail below. FIG. 2 shows the information provision system according to an example embodiment of the present disclosure. The information provision system 100 has an information provision apparatus 110, traffic lights 120A and 120B, cameras 130A and 130B, and roadside units 140A and 140B. The information provision system 100 corresponds to the information provision system 10 shown in FIG. 1. The information provision apparatus 110 corresponds to the information provision apparatus 20 shown in FIG. 1. The cameras 130A and 130B correspond to the imaging apparatus 30 shown in FIG. 1.

The information provision apparatus 110 provides information about the parking lot entrances to vehicles 150. For example, the information provision apparatus 110 provides information about the parking lot entrance selected from among the plurality of parking lot entrances including a first parking lot entrance to the vehicle 150 heading for the first parking lot entrance. The parking lot may be, for example, a parking lot associated with a commercial facility. The information provision apparatus 110 may be installed, for example, in a commercial facility and operated by an operator of the commercial facility.

The traffic light 120A, the camera 130A, and the roadside unit 140A are disposed at an intersection 200A. The traffic light 120B, the camera 130B, and the roadside unit 140B are disposed at an intersection 200B. Assume that the intersection 200A is, for example, an intersection (first intersection) on a rear side of the first parking lot entrance as seen from the vehicles 150 heading for the first parking lot entrance. Assume also that the intersection 200B is an intersection (second intersection) on a front side of the first parking lot entrance as seen from the vehicles 150 heading for the first parking lot entrance.

In the following description, the intersections 200A and 200B are also collectively referred to as an intersection 200 when there is no particular need to distinguish between them. Also, the traffic lights 120A and 120B, the cameras 130A and 130B, and roadside units 140A and 140B are also collectively referred to as an intersection 200, a traffic light 120, a camera 130, and a roadside unit 140, respectively, when there is no particular need to distinguish between them.

FIG. 2 shows two intersections 200, but the number of intersections 200 is not particularly limited. In addition, it is not necessary that all traffic lights 120, cameras 130, and roadside units 140 are disposed at each intersection 200. At some intersections 200, some of traffic lights 120, cameras 130, and roadside units 140 may be omitted. In addition, three vehicles 150 are illustrated in FIG. 2, but the number of vehicles 150 is also not particularly limited.

The information provision apparatus 110, the traffic lights 120, the cameras 130, the roadside units 140, and the vehicles 150 are connected to one another via a network 160. The network 160 includes, for example, a wired communication network and a wireless communication network. The network 160 may include a network using a communication line standard such as LTE (Long Term Evolution). Alternatively, the network 160 may include a wireless communication network such as WiFi (registered trademark) or a 5th generation mobile communication system.

The traffic light 120 is installed on a road leading to the parking lot entrance at the intersection 200. The traffic light 120 controls traffic flow at the intersection 200. Light status of the traffic light 120 is controlled by a signal control panel (not shown). Alternatively, the light status of the traffic light 120 is controlled by a central server such as a traffic control center (not shown).

The camera 130 photographs videos of roads around the intersection 200. The camera 130 includes a camera that can photograph a video near the parking lot entrance (first parking lot entrance). The camera 130 only needs to be able to photograph a video of the road near the parking lot, and does not necessarily have to photograph the video of the entrance of the parking lot. The plurality of cameras 130 may be installed at one intersection 200. For example, assume that the camera 130A at the intersection 200A is a camera that photographs a video of the area near the first parking lot entrance. In that case, the camera 130B at the intersection 200B may be a camera that can photograph videos of the area near another parking lot entrance (second parking lot entrance) different from the first parking lot entrance. The first parking lot entrance and the second parking lot entrance may be entrances to the same parking lot or different parking lot entrances. The camera 130 may be installed at the traffic light 120.

The Roadside Unit (RSU) 140 is configured to be able to communicate with the vehicles 150 passing on the road near the intersection 200. The roadside unit 140 may, for example, directly communicate wirelessly with the vehicles 150. The roadside unit 140 includes a wireless communication device that performs, for example, Vehicle to Infrastructure (V2I) communication.

The vehicle 150 includes an on-board apparatus that can perform, for example, Vehicle to Everything (V2X) communication. The vehicle 150 is configured to enable Vehicle to Vehicle (V2V) communication with other vehicles 150.

Figure 3:
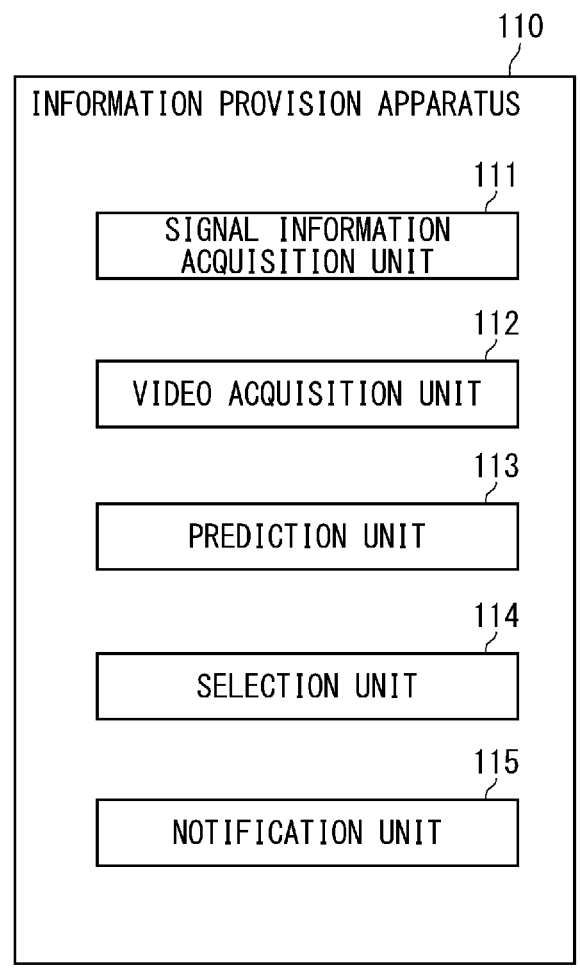
FIG. 3 is a block diagram showing an example of a configuration of an information provision apparatus.

FIG. 3 shows an example of a configuration of the information provision apparatus 110. The information provision apparatus 110 has a signal information acquisition unit 111, a video acquisition unit 112, a prediction unit 113, a selection unit 114, and a notification unit 115. The information provision apparatus 110 is configured as a computer apparatus (server apparatus) having, for example, a processor and a memory. At least some of the functions of the components in the information provision apparatus 110 may be implemented by the processor operating according to a program read from the memory.

The signal information acquisition unit 111 acquires signal information that is information about the traffic light 120 (see FIG. 2). The signal information includes first signal information that is information about the traffic light (first traffic light) 120A installed at the intersection 200A. The signal information includes second signal information that is information about the traffic light (second signal) 120B installed at the intersection 200B. The signal information indicates, for example, the current light status of the traffic light 120. The signal information may include information indicating the number of seconds it takes for the light status of the traffic light 120 to switch.

The signal information acquisition unit 111 acquires the signal information from, for example, a signal control panel (not shown). Alternatively, the signal information acquisition unit 111 may acquire the signal information from a central server such as a traffic control center (not shown). The signal information acquisition unit 111 may acquire the signal information by determining the light status of the traffic light from the video of the traffic light 120 photographed using the camera 130. The signal information acquisition unit 111 may acquire the signal information about the plurality of traffic lights installed around the plurality of parking lot entrances. The signal information acquisition unit 111 corresponds to the signal information acquisition means 21 shown in FIG. 1.

The video acquisition unit 112 acquires a video of the road near the parking lot from the camera 130. The video acquired by the video acquisition unit 112 includes a video photographed near the first parking lot entrance. Here, "near the parking lot entrance" means, for example, an area of the road leading to the parking lot entrance within a predetermined distance from the parking lot entrance. For example, the video acquisition unit 112 acquires the video photographed near the first parking lot entrance from the camera 130A installed at the intersection 200A. The video acquisition unit 112 may acquire the video photographed near the second parking lot entrance from the camera 130B installed at the intersection 200B. The video acquisition unit 112 corresponds to the image acquisition means 22 shown in FIG. 1.

The prediction unit 113 predicts whether or not congestion will occur on the road near the parking lot based on the signal information acquired by the signal information acquisition unit 111 and the video acquired by the video acquisition unit 112. More specifically, the prediction unit 113 predicts whether or not congestion will occur near the first parking lot entrance based on the signal information and the video. For example, the prediction unit 113 predicts whether or not a queue of waiting vehicles will be formed near the first parking lot entrance. The prediction unit 113 may predict whether the queue of waiting vehicles will be formed near the first parking lot entrance based on the above video and signal information from the plurality of traffic lights. Here, the "queue of waiting vehicles" means, for example, a queue of the vehicles 150 extending from the intersection 200A toward the direction of the first parking lot entrance.

The prediction unit 113 predicts whether or not the queue of waiting vehicles will be formed when, for example, the light status of the traffic light 120A indicates "cannot proceed". For example, the prediction unit 113 performs image analysis on the video near the first parking lot entrance and estimates the number of vehicles 150 between the intersection 200A and near the first parking lot entrance. Based on the estimated number of vehicles 150 and the signal information of the traffic light 120A, the prediction unit 113 predicts whether or not the queue of waiting vehicles will be formed when the light status of the traffic light 120A indicates "cannot proceed".

For example, the prediction unit 113 estimates how many vehicles 150 cannot pass the intersection 200A and stop at the traffic light 120A when the light status of the traffic light 120A indicates "cannot proceed". If the queue of waiting vehicles stopping at the traffic light 120A blocks the first parking lot entrance, it is predicted that the queue of waiting vehicles will be formed and it is predicted that the area near the first parking lot entrance will be congested. The prediction unit 113 corresponds to the prediction means 23 shown in FIG. 1.

Based on the prediction result of the prediction unit 113, the selection unit 114 selects, from among the plurality of parking lot entrances, the parking lot entrance to which the vehicles 150 is to be guided. When the prediction unit 113 predicts that the queue of waiting vehicles is predicted to be formed near the first parking lot entrance, the prediction unit 113 selects the second parking lot entrance as the parking lot entrance to which the vehicles 150 is to be guided. In other words, when the vicinity of the first parking lot entrance is predicted to be congested, the selection unit 114 selects the second parking lot entrance as an alternative to the first parking lot entrance. For example, the selection unit 114 selects the second parking lot entrance when the light status of the traffic light 120A indicates "cannot proceed" at the intersection 200A and the light status of the traffic light 120B indicates "can proceed" at the intersection 200B. The selection unit 114 may select the first parking lot entrance when no queue of waiting vehicles is predicted to be formed near the first parking lot entrance. The selection unit 114 corresponds to the selection means 24 shown in FIG. 1.

The notification unit 115 notifies the vehicle 150 of the parking lot entrance selected by the selection unit 114. The notification unit 115 notifies the vehicles 150 of, for example, position information about the selected parking lot entrance and/or route information leading to the selected parking lot entrance. The notification unit 115 notifies the vehicles 150 of the selected parking lot entrance via, for example, the network 160.

The notification unit 115 may further notify at least one of the vehicles 150 in the queue of waiting vehicles and the vehicle 150 positioned before the queue of waiting vehicles of an occurrence status of the queue of waiting vehicles, for example, a length of the queue of waiting vehicles. For example, the notification unit 115 may cause the occurrence status of the queue of waiting vehicles to be propagated among the plurality of roadside units 140 to notify the vehicles 150 of the occurrence status of the queue of waiting vehicles from the roadside units 140. Alternatively or additionally, the notification unit 115 may cause the occurrence status of the queue of waiting vehicles to be propagated among the vehicles 150 via vehicle-to-vehicle communication between the vehicles 150 to notify the vehicles 150 of the occurrence status of the queue of waiting vehicles. For example, by knowing the occurrence status of the queue of waiting vehicles, the vehicle 150 that does not enter the parking lot can evade the queue of waiting vehicles and travel. The notification unit 115 corresponds to the notification means 25 shown in FIG. 1.

Figure 4:
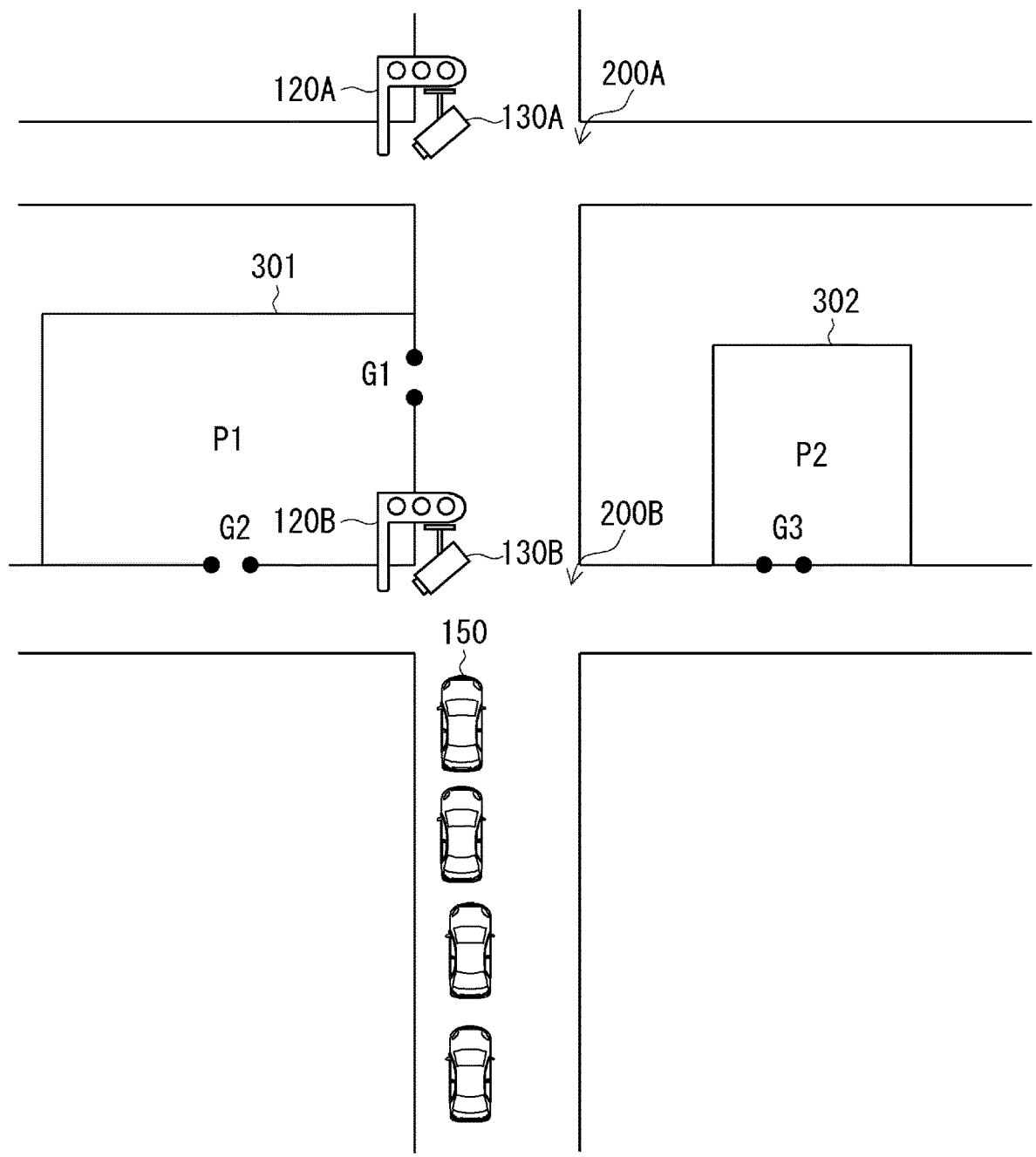
FIG. 4 is a schematic diagram showing an example of a positional relationship between a plurality of parking lot entrances and intersections.

FIG. 4 shows an example of a positional relationship between a plurality of parking lot entrances and intersections. In FIG. 4, a parking lot (P1) 301 has two entrances (parking lot entrances) G1 and G2. A parking lot (P2) 302 has an entrance G3. Here, it is assumed that the entrance G1 of the parking lot 301 is the first parking lot entrance where the vehicles 150 are heading. The intersection 200A is an intersection on a rear side of the entrance G1 as seen from the vehicles 150 heading for the entrance G1. The traffic light 120A and the camera 130A are installed at the intersection 200A.

The intersection 200B is an intersection on a front side of the entrance G1 as seen from the vehicles 150. The entrance G1 is a parking lot entrance located at a position after the vehicles 150 go straight through the intersection. The traffic light 120B and the camera 130B are installed at the intersection 200B. The entrance G2 of the parking lot 301 is a parking lot entrance located at a position after the vehicles 150 turn left at the intersection 200B. The entrance G3 of the parking lot 302 is a parking lot entrance located at a position after the vehicles 150 turn right at the intersection 200B. Although not shown in FIG. 4, the roadside units 140A and 140B (see FIG. 2) may be installed at the intersections 200A and 200B, respectively.

In the information provision apparatus 110, the signal information acquisition unit 111 acquires the signal information about the traffic light 120A. The signal information acquisition unit 111 further acquires the signal information about the traffic light 120B. The video acquisition unit 112 acquires a video from the camera 130A. Based on the signal information and the video of the camera 130A, the prediction unit 113 predicts whether or not a queue of waiting vehicles will be formed in a section from the intersection 200A to the intersection 200B, including the entrance G1.

For example, suppose the traffic light 120A changes from green ("can proceed") to red ("cannot proceed"). In this case, the vehicle 150 stops before the traffic light 120A. At this time, if the number of vehicles 150 heading for the intersection 200A is large, the queue of vehicles 150 stopped before the traffic light 120A blocks the entrance G1. In this case, the prediction unit 113 predicts that the queue of waiting vehicles will be formed near the entrance G1 and that the area near entrance G1 will be congested. When the area near the entrance G1 will be congested, the vehicles 150 wishing to enter the parking lot 301 from the entrance G1 need to wait on the road.

When the traffic light 120A changes to red and the queue of vehicles blocks the entrance G1, the selection unit 114 selects the entrance G2 or G3 as the parking lot entrance (second parking lot entrance) which the vehicle 150 is to be notified of if the traffic light 120B is green. At this time, the selection unit 114 may determine whether or not the vicinity of the entrance G2 and the vicinity of the entrance G3 are congested using the video of the camera 130B. The selection unit 114 may select the entrance G2 or G3 as the parking lot entrance which the vehicle 150 is to be notified of when the vicinity of the entrance G2 and the vicinity of G3 are not congested.

When the vicinity of the entrance G1 is predicted to be congested, the notification unit 115 notifies the vehicle 150 of the entrance G2 or G3. The vehicle 150 can make a left turn at the intersection 200B and enter the parking lot 301 from the entrance G2. Alternatively, the vehicle 150 can make a right turn at the intersection 200B and enter the parking lot 302 from the entrance G3. In this example embodiment, when congestion is predicted near the entrance G1, the user can enter the parking lot from another parking lot entrance and can enter the parking lot without waiting.

When the selection unit 114 selects a parking lot entrance for the plurality of vehicles 150 approaching the intersection 200B, the selection unit may select the entrance G1 for some vehicles and the entrance G2 or G3 for the remaining vehicles. For example, the selection unit 114 may select the entrance G1 for one or more vehicles (first vehicle group) from among the plurality of vehicles 150 that are expected to reach the entrance G1 before the queue of waiting vehicles is formed. The selection unit 114 may select the entrance G2 or G3 for one or more vehicles (second vehicle group) from among the plurality of vehicles 150 that are expected to be unable to reach the entrance G1 before the queue of waiting vehicles is formed. In this case, it is possible to guide the first vehicle group and the second vehicle group to the parking lot entrances where they can enter without waiting, respectively. Specifically, consider a case where the traffic light 120B changes from red to green and the traffic light 120A changes from green to red. In this case, if congestion is predicted near the entrance G1, the selection unit 114 may select the entrance G1 for one or more vehicles positioned ahead of the rest of the plurality of vehicles 150. On the other hand, the selection unit 114 may select the entrance G2 or G3 for one or more vehicles positioned behind the rest of the plurality of vehicles 150.

Figure 5:
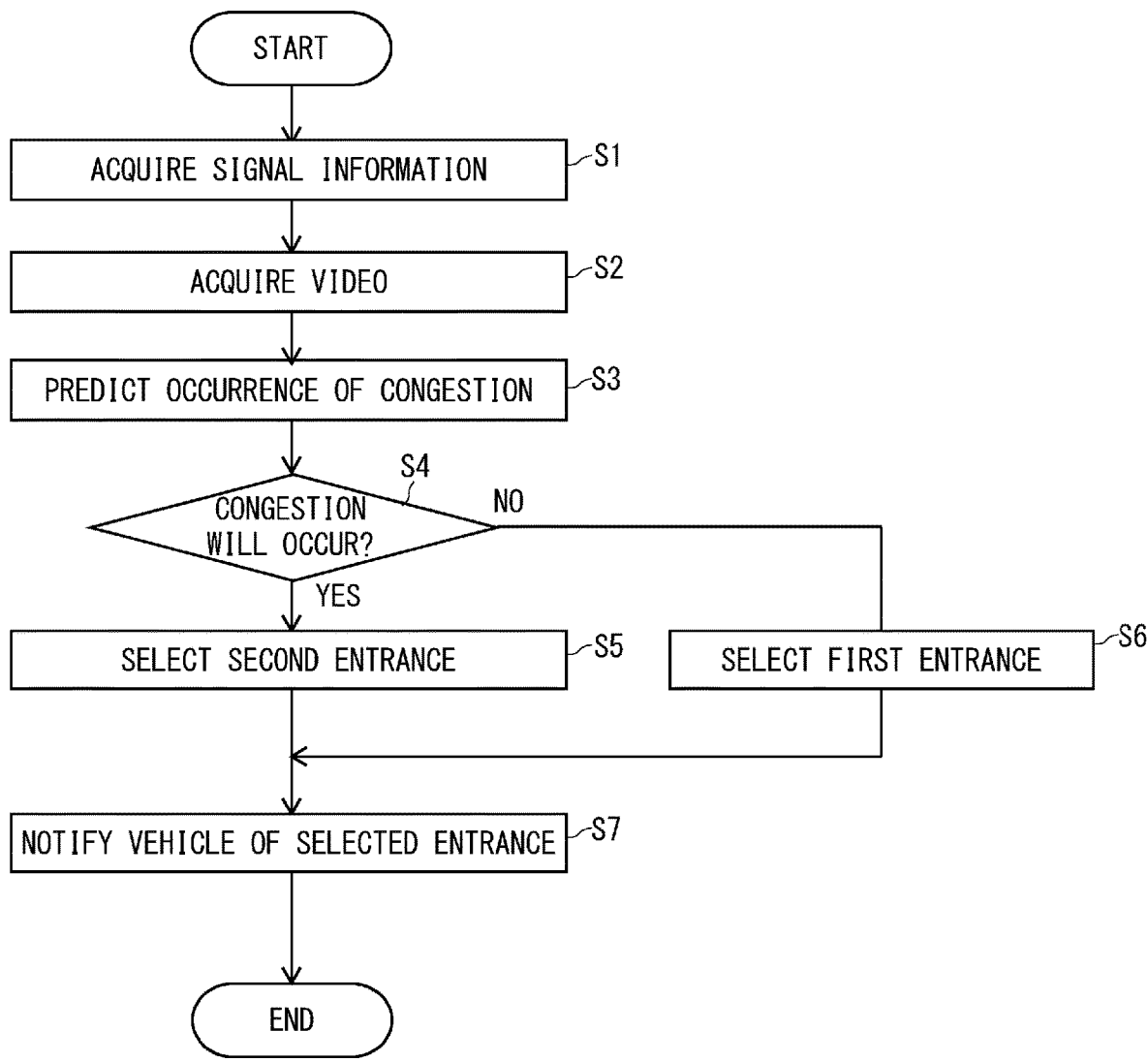
FIG. 5 is a flowchart showing an operation procedure in the information provision apparatus.

Next, an operation procedure is described. FIG. 5 shows the operation procedure (information provision method) in the information provision apparatus 110. The signal information acquisition unit 111 acquires the signal information about the traffic light 120 (Step S1). The video acquisition unit 112 acquires the video photographed using the camera 130 (Step S2). Based on the signal information acquired in Step S1 and the video acquired in Step S2, the prediction unit 113 predicts whether or not congestion will occur near the first parking lot entrance (Step S3).

The selection unit 114 determines whether or not congestion is predicted to occur in Step S3 (Step S3). When congestion is predicted to occur, the selection unit 114 selects the second parking lot entrance that is different from the first parking lot entrance (Step S4). In Step S3, the selection unit 114 selects, for example, the entrance G2 or G3 shown in FIG. 4 as the second parking lot entrance (Step S5). When the selection unit 114 determines that congestion is not predicted to occur in Step S3, it selects the first parking lot entrance (Step S6). The notification unit 115 notifies the vehicle 150 of the parking lot entrance selected by the selection unit 114 (Step S7).

Since the vehicle 150 is heading for the first parking lot entrance, the destination of the vehicle 150 does not change when congestion is not predicted near the first parking lot entrance. For this reason, the above Step S6 may be omitted. Also, the notification in Step S7 may be omitted.

In this example embodiment, the prediction unit 113 predicts whether or not congestion will occur near the first parking lot entrance based on the signal information about the traffic light 120 and the video of the camera 130. When the prediction unit 113 predicts congestion, the selection unit 114 selects a parking lot entrance (second parking lot entrance) different from the first parking lot entrance. The notification unit 115 notifies the vehicle 150 of the selected parking lot entrance. In this way, under a situation where a traffic status can change from time to time depending on the light status of the traffic light 120, the information provision apparatus 110 can guide the vehicles 150 to the parking lot entrances where the vehicles 150 can enter the parking lot smoothly.

Figure 6:
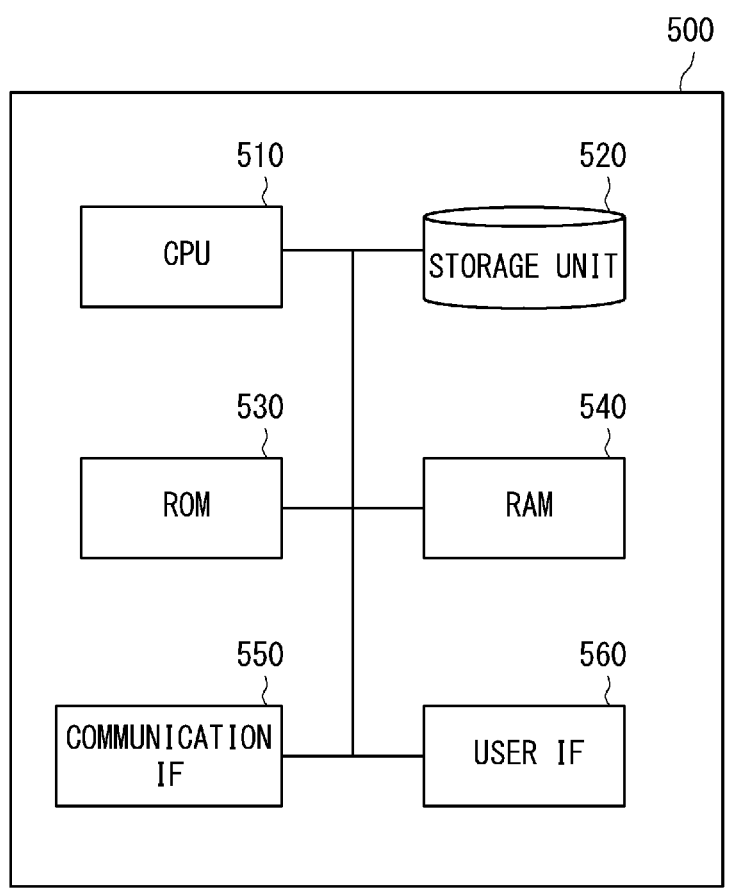
FIG. 6 is a block diagram showing an example of a configuration of a computer apparatus.

Next, an example of a hardware configuration of the information provision apparatus 110 is described. FIG. 6 shows an example of the configuration of a computer apparatus that can be used as the information provision apparatus 110. A computer apparatus 500 has a control unit (CPU: Central Processing Unit) 510, a storage unit 520, a Read Only Memory (ROM) 530, a Random Access Memory (RAM) 540, a communication interface (IF: Interface) 550, and a user interface 560.

The communication interface 550 is an interface for connecting the computer apparatus 500 to a communication network via wired communication means or wireless communication means. The user interface 560 includes a display unit such as a display. The user interface 560 also includes an input unit such as a keyboard, mouse, and touch panel.

The storage unit 520 is an auxiliary storage device that can hold various kinds of data. The storage unit 520 does not necessarily have to be part of the computer apparatus 500, and instead may be an external storage device or a cloud storage device connected to the computer apparatus 500 via a network.

The ROM 530 is a non-volatile storage device. For the ROM 530, a semiconductor storage device such as a flash memory with a relatively small capacity is used. The program executed by the CPU 510 can be stored in the storage unit 520 or the ROM 530. The storage unit 520 or the ROM 530 stores various programs, for example, for implementing the functions of each unit in the information provision apparatus 110.

In the above example, the program can be stored and provided to the computer apparatus 500 using any type of non-transitory computer readable media. Non-transitory computer readable media include any type of tangible storage media. Examples of non-transitory computer readable media include magnetic storage media, optical magnetic storage media, and semiconductor memories. The magnetic storage media may be floppy disks, magnetic tapes, hard disk drives, etc. The optical magnetic storage media include storage media such as magneto-optical disk. The magneto-optical disks include disk media such as CD (compact disc), DVD (digital versatile disk). The semiconductor memories may be mask ROM, PROM (Programmable ROM), EPROM (Erasable PROM), flash ROM, RAM, etc. The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The RAM 540 is a volatile storage device. Various semiconductor memory devices such as DRAM (Dynamic Random Access Memory) or SRAM (Static Random Access Memory) are used for the RAM 540. The RAM 540 can be used as an internal buffer for temporarily storing data and the like. The CPU 510 deploys the program stored in the storage unit 520 or the ROM 530 to the RAM 540 and executes it. When the CPU 510 executes the program, the function of each unit in the information provision apparatus 110 can be implemented. The CPU 510 may have an internal buffer that can temporarily store data, etc.

Although the example embodiment of the present disclosure has been described in detail above, the present disclosure is not limited to the above-described example embodiment, and changes and modifications that are made to the above-described embodiment without departing from the scope of the present disclosure are also included in the present disclosure.

The whole or part of the example embodiment disclosed above can be described as, but not limited to, the following supplementary notes.

[Supplementary Note 1]

An information provision apparatus including:
signal information acquisition means for acquiring signal information about a traffic light installed on a road;
video acquisition means for acquiring a video photographed near a first parking lot entrance facing the road;
prediction means for predicting whether or not a queue of waiting vehicles will be formed near the first parking lot entrance based on the video and the signal information;
selection means for selecting, from among a plurality of the parking lot entrances including the first parking lot entrance, a parking lot entrance to which a vehicle is to be guided based on a result of the prediction performed by the prediction means; and
notification means for notifying the vehicle of the selected parking lot entrance.

[Supplementary Note 2]

The information provision apparatus according to supplementary note 1, wherein
the signal information includes first signal information about a first traffic light installed at a first intersection on a rear side of the first parking lot entrance as seen from the vehicle, and the prediction means predicts whether or not the queue of waiting vehicles will be formed when light status of the first traffic light indicates "cannot proceed".

[Supplementary Note 3]

The information provision apparatus according to supplementary note 2, wherein the prediction means estimates the number of vehicles between the first intersection and the vicinity of the first parking lot entrance based on the video, and predicts whether or not the queue of waiting vehicles will be formed when the light status of the first traffic light indicates "cannot proceed" based on the estimated number of vehicles and the first signal information.

[Supplementary Note 4]

The information provision apparatus according to supplementary note 2 or 3, wherein
the plurality of parking lot entrances include a second parking lot entrance located at a position after the vehicle turns right or turns left at a second intersection on a front side of the first parking lot entrance as seen from the vehicle, and
the selection means selects the second parking lot entrance when the queue of waiting vehicles is predicted to be formed.

[Supplementary Note 5]

The information provision apparatus according to supplementary note 4, wherein
the signal information further includes second signal information about a second traffic light installed at the second intersection, and
the selection means selects the second parking lot entrance when the light status of the first traffic light indicates "cannot proceed" and the light status of the second signal indicates "can proceed".

[Supplementary Note 6]

The information provision apparatus according to supplementary note 4 or 5, wherein the selection means selects the first parking lot entrance for a vehicle that is predicted to reach the first parking lot entrance before the queue of waiting vehicles is formed, and selects the second parking lot entrance for a vehicle that is predicted to be unable to reach the first parking lot entrance before the queue of waiting vehicles is formed.

[Supplementary note 7]

The information provision apparatus according to any one of supplementary notes 4 to 6, wherein the first parking lot entrance and the second parking lot entrance are entrances for entering the same parking lot.

[Supplementary Note 8]

The information provision apparatus according to any one of supplementary notes 4 to 6, wherein the first parking lot entrance and the second parking lot entrance are entrances for entering different parking lots.

[Supplementary Note 9]

The information provision apparatus according to any one of supplementary notes 1 to 8, wherein
the signal information acquisition means acquires the signal information about a plurality of the traffic lights installed around the plurality of parking lot entrances, and
the prediction means predicts whether or not the queue of waiting vehicles will be formed based on the video and a plurality of pieces of the signal information.

[Supplementary Note 10]

The information provision apparatus according to any one of supplementary notes 1 to 9, wherein the notification means further notifies the vehicles in the queue of waiting vehicles and the vehicle positioned before the queue of waiting vehicles of an occurrence status of the queue of waiting vehicles using at least one of communication between roadside units installed at intersections and vehicle-to-vehicle communication between the vehicles.

[Supplementary Note 11]

The information provision apparatus according to any one of supplementary notes 1 to 10, wherein the signal information includes information indicating the number of seconds it takes for the light status of the traffic light to switch.

[Supplementary Note 12]

The information provision apparatus according to any one of supplementary notes 1 to 11, wherein the selection means selects the first parking lot entrance when the queue of waiting vehicles is not predicted to be formed.

[Supplementary Note 13]

An information provision system including:
an imaging apparatus configured to photograph near a first parking lot entrance facing a road; and
an information provision apparatus, wherein
the information provision apparatus includes:
signal information acquisition means for acquiring signal information about a traffic light installed on the road;
video acquisition means for acquiring a video photographed using the imaging apparatus;
prediction means for predicting whether or not a queue of waiting vehicles will be formed near the first parking lot entrance based on the video and the signal information;
selection means for selecting, from among a plurality of the parking lot entrances including the first parking lot entrance, a parking lot entrance to which a vehicle is to be guided based on a result of the prediction performed by the prediction means; and
notification means for notifying the vehicle of the selected parking lot entrance.

[Supplementary Note 14]

The information provision system according to supplementary note 13, wherein
the signal information includes first signal information about a first traffic light installed at a first intersection on a rear side of the first parking lot entrance as seen from the vehicle, and
the prediction means predicts whether or not the queue of waiting vehicles will be formed when light status of the first traffic light indicates "cannot proceed".

[Supplementary Note 15]

The information provision system according to supplementary note 14, wherein
the plurality of parking lots include a second parking lot entrance located at a position after the vehicle turns right or turns left at a second intersection on a front side of the first parking lot entrance as seen from the vehicle, and
the selection means selects the second parking lot entrance when the queue of waiting vehicles is predicted to be formed.

[Supplementary Note 16]

The information provision system according to supplementary note 15, wherein
the signal information further includes second signal information about a second traffic light installed at the second intersection, and
the selection means selects the second parking lot entrance when the light status of the first traffic light indicates "cannot proceed" and the light status of the second signal indicates "can proceed".

[Supplementary Note 17]

An information provision method including:
acquiring signal information about a traffic light installed on a road;
acquiring a video photographed near a first parking lot entrance facing the road;
predicting whether or not a queue of waiting vehicles will be formed near the first parking lot entrance based on the video and the signal information;
selecting, from among a plurality of the parking lot entrances including the first parking lot entrance, a parking lot entrance to which a vehicle is to be guided based on a result of the prediction about whether or not the queue of waiting vehicles will be formed; and
notifying the vehicle of the selected parking lot entrance.

[Supplementary Note 18]

A non-transitory computer readable medium storing a program for causing a computer to execute processing of:
acquiring signal information about a traffic light installed on a road;
acquiring a video photographed near a first parking lot entrance facing the road;
predicting whether or not a queue of waiting vehicles will be formed near the first parking lot entrance based on the video and the signal information;
selecting, from among a plurality of the parking lot entrances including the first parking lot entrance, a parking lot entrance to which a vehicle is to be guided based on a result of the prediction about whether or not the queue of waiting vehicles will be formed; and
notifying the vehicle of the selected parking lot entrance.

REFERENCE SIGNS LIST

10: INFORMATION PROVISION SYSTEM
20: INFORMATION PROVISION APPARATUS
21: SIGNAL INFORMATION ACQUISITION MEANS
22: VIDEO ACQUISITION MEANS
23: PREDICTION MEANS
24: SELECTION MEANS
25: NOTIFICATION MEANS
30: IMAGING APPARATUS
100: INFORMATION PROVISION SYSTEM
110: INFORMATION PROVISION APPARATUS
111: SIGNAL INFORMATION ACQUISITION UNIT
112: VIDEO ACQUISITION UNIT
113: PREDICTION UNIT
114: SELECTION UNIT
115: NOTIFICATION UNIT
120: TRAFFIC LIGHT
130: CAMERA
140: ROADSIDE UNIT
150: VEHICLE
160: NETWORK
301, 302: PARKING LOT
500: COMPUTER APPARATUS
510: CPU
520: STORAGE UNIT
530: ROM
540: RAM
550: COMMUNICATION INTERFACE
560: USER INTERFACE

What is claimed is:

1. An information provision apparatus comprising:
a memory storing instructions; and
a processor configured to execute the instructions to:
acquire signal information about a traffic light installed on a road;
acquire a video photographed near a first parking lot entrance facing the road;
perform a prediction whether or not a queue of waiting vehicles will be formed near the first parking lot entrance based on the video and the signal information;
select, from among a plurality of the parking lot entrances including the first parking lot entrance, a parking lot entrance to which a vehicle is to be guided based on a result of the prediction; and
notify the vehicle of the selected parking lot entrance.

2. The information provision apparatus according to claim 1, wherein
the signal information includes first signal information about a first traffic light installed at a first intersection on a rear side of the first parking lot entrance as seen from the vehicle, and
the processor is configured to execute the instructions to perform the prediction whether or not the queue of waiting vehicles will be formed when light status of the first traffic light indicates "cannot proceed".

3. The information provision apparatus according to claim 2, wherein the processor is configured to execute the instructions to estimate a number of vehicles between the first intersection and the vicinity of the first parking lot entrance based on the video, and perform the prediction whether or not the queue of waiting vehicles will be formed when the light status of the first traffic light indicates "cannot proceed" based on the estimated number of vehicles and the first signal information.

4. The information provision apparatus according to claim 2, wherein
the plurality of parking lot entrances include a second parking lot entrance located at a position after the vehicle turns right or turns left at a second intersection on a front side of the first parking lot entrance as seen from the vehicle, and
the processor is configured to execute the instructions to select the second parking lot entrance when the queue of waiting vehicles is predicted to be formed.

5. The information provision apparatus according to claim 4, wherein
the signal information further includes second signal information about a second traffic light installed at the second intersection, and
the processor is configured to execute the instructions to select the second parking lot entrance when the light status of the first traffic light indicates "cannot proceed" and the light status of the second signal indicates "can proceed".

6. The information provision apparatus according to claim 4, wherein the processor is configured to execute the instructions to select the first parking lot entrance for a vehicle that is predicted to reach the first parking lot entrance before the queue of waiting vehicles is formed, and select the second parking lot entrance for a vehicle that is predicted to be unable to reach the first parking lot entrance before the queue of waiting vehicles is formed.

7. The information provision apparatus according to claim 4, wherein the first parking lot entrance and the second parking lot entrance are entrances for entering a same parking lot.

8. The information provision apparatus according to claim 4, wherein the first parking lot entrance and the second parking lot entrance are entrances for entering different parking lots.

9. The information provision apparatus according to claim 1, wherein
the processor is configured to execute the instructions to acquire the signal information about a plurality of the traffic lights installed around the plurality of parking lot entrances, and
the processor is configured to execute the instructions to perform the prediction whether or not the queue of waiting vehicles will be formed based on the video and a plurality of pieces of the signal information.

10. The information provision apparatus according to claim 1, wherein the processor is configured to execute the instructions to notify the vehicles in the queue of waiting vehicles and the vehicle positioned before the queue of waiting vehicles of an occurrence status of the queue of waiting vehicles using at least one of communication between roadside units installed at intersections and vehicle-to-vehicle communication between the vehicles.

11. The information provision apparatus according to claim 1, wherein the signal information includes information indicating a number of seconds it takes for light status of the traffic light to switch.

12. The information provision apparatus according to claim 1, wherein the processor is configured to execute the instructions to select the first parking lot entrance when the queue of waiting vehicles is not predicted to be formed.

13. An information provision system comprising:
a camera configured to photograph near a first parking lot entrance facing a road; and
the information provision apparatus according to claim 1.

14. The information provision system according to claim 13, wherein
the signal information includes first signal information about a first traffic light installed at a first intersection on a rear side of the first parking lot entrance as seen from the vehicle, and
the processor is configured to execute the instructions to perform the prediction whether or not the queue of waiting vehicles will be formed when light status of the first traffic light indicates "cannot proceed".

15. The information provision system according to claim 14, wherein
the plurality of parking lot entrances include a second parking lot entrance located at a position after the vehicle turns right or turns left at a second intersection on a front side of the first parking lot entrance as seen from the vehicle, and
the processor is configured to execute the instructions to select the second parking lot entrance when the queue of waiting vehicles is predicted to be formed.

16. The information provision system according to claim 15, wherein
the signal information further includes second signal information about a second traffic light installed at the second intersection, and
the processor is configured to execute the instructions to select the second parking lot entrance when the light status of the first traffic light indicates "cannot proceed" and the light status of the second signal indicates "can proceed".

17. An information provision method comprising:
acquiring signal information about a traffic light installed on a road;
acquiring a video photographed near a first parking lot entrance facing the road;
performing a prediction whether or not a queue of waiting vehicles will be formed near the first parking lot entrance based on the video and the signal information;
selecting, from among a plurality of the parking lot entrances including the first parking lot entrance, a parking lot entrance to which a vehicle is to be guided based on a result of the prediction; and
notifying the vehicle of the selected parking lot entrance.

18. A non-transitory computer readable medium storing a program for causing a computer to execute processing of:
acquiring signal information about a traffic light installed on a road;
acquiring a video photographed near a first parking lot entrance facing the road;
performing a prediction predicting whether or not a queue of waiting vehicles will be formed near the first parking lot entrance based on the video and the signal information;
selecting, from among a plurality of the parking lot entrances including the first parking lot entrance, a parking lot entrance to which a vehicle is to be guided based on a result of the prediction; and
notifying the vehicle of the selected parking lot entrance.

* * * * *